US012686259B2

(12) United States Patent
Lehmann et al.

(10) Patent No.: US 12,686,259 B2
(45) Date of Patent: Jul. 21, 2026

(54) DRIVE TRAIN FOR A HYBRID MOTOR VEHICLE

(71) Applicant: Schaeffler Technologies AG & Co. KG, Herzogenaurach (DE)

(72) Inventors: Steffen Lehmann, Ettlingen (DE); Laurent Bayoux, Strasbourg (FR); Andreas Trinkenschuh, Buhl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 284 days.

(21) Appl. No.: 18/565,691

(22) PCT Filed: Apr. 25, 2022

(86) PCT No.: PCT/DE2022/100310
§ 371 (c)(1),
(2) Date: Nov. 30, 2023

(87) PCT Pub. No.: WO2022/258098
PCT Pub. Date: Dec. 15, 2022

(65) Prior Publication Data
US 2024/0270061 A1     Aug. 15, 2024

(30) Foreign Application Priority Data
Jun. 7, 2021    (DE) .......................... 102021114513.9

(51) Int. Cl.
*B60K 6/40*          (2007.10)
*B60K 6/26*          (2007.10)
(Continued)

(52) U.S. Cl.
CPC .................. *B60K 6/40* (2013.01); *B60K 6/26* (2013.01); *B60K 6/36* (2013.01); *B60K 6/387* (2013.01); *B60K 6/442* (2013.01); *B60Y 2200/92* (2013.01)

(58) Field of Classification Search
CPC ... B60K 6/40; B60K 6/26; B60K 6/36; B60K 6/387; B60K 6/442; B60Y 2200/92
See application file for complete search history.

(56) References Cited

U.S. PATENT DOCUMENTS 11,186,161 B2 * 11/2021 Qiu ........................ B60K 6/365
12,024,022 B2 * 7/2024 Larsson ................. B60K 6/442

FOREIGN PATENT DOCUMENTS

CN        104723862 A      6/2015
CN        106660441 A      5/2017
(Continued)

*Primary Examiner* — John D Walters
(74) *Attorney, Agent, or Firm* — Volpe Koenig

(57) ABSTRACT
A drive train for a hybrid motor vehicle, having a first electric machine with a rotor, which comprises a rotor support, and with a stator The first electric machine has an installation space which is formed by the outer dimensions of the stator and within which the rotor support is arranged, and a first transmission device for transmitting a torque and a rotation speed. The first transmission device has an installation space which is formed by the outer dimensions of the first transmission device. The first transmission device is arranged on the rotor support such that the installation space of the first transmission device and the installation space of the first electric machine overlap. The first transmission device is designed as a shiftable clutch apparatus and/or as a transmission for converting a torque and a rotation speed.

11 Claims, 2 Drawing Sheets

(51) Int. Cl.
    *B60K 6/36*         (2007.10)
    *B60K 6/387*      (2007.10)
    *B60K 6/442*      (2007.10)

(56)              References Cited

FOREIGN PATENT DOCUMENTS

| | | | |
|---|---|---|---|
| CN | 111372801 | A | 7/2020 |
| DE | 102015219462 | A1 | 4/2017 |
| EP | 3750734 | A1 | 12/2020 |
| EP | 3795401 | A1 | 3/2021 |
| JP | 2010159022 | A | 7/2010 |
| WO | 2019101264 | A1 | 5/2019 |

* cited by examiner

DRIVE TRAIN FOR A HYBRID MOTOR VEHICLE

CROSS-REFERENCE TO RELATED APPLICATIONS

This application is the U.S. National Phase of PCT Appln. No. PCT/DE2022/100310, filed Apr. 25, 2022, which claims the benefit of German Patent Appln. No. 102021114513.9, filed Jun. 7, 2021, the entire disclosures of which are incorporated by reference herein.

TECHNICAL FIELD

The disclosure relates to a drive train for a hybrid motor vehicle.

BACKGROUND

Drive trains for hybrid motor vehicles are known from the prior art which have two electric machines in addition to an internal combustion engine.

Such a drive train is disclosed, for example, in WO 2019/101264 A1. In this case, an internal combustion engine is connected via a transmission stage directly to a first electric machine, which is designed as a generator.

Furthermore, a second electric machine is designed as the main drive machine and is connected via two transmission stages to a gearing to which the wheels of the vehicle are attached. There is a clutch between the first and second electric machines, which enables so-called serial driving in the disengaged state and so-called parallel driving with a motor vehicle in the engaged state.

More precisely, a motor vehicle with a drive train as shown in FIG. 2 of WO 2019/101264 A1 can be operated in serial mode, in which the internal combustion engine drives the first electric machine to generate energy and in which the second electric machine applies a torque to the wheels of the vehicle. Furthermore, such a drive train can be operated in parallel mode, in which the internal combustion engine applies a torque to the wheels of the vehicle and the second electric machine runs idle, is boosted or recuperates.

Such a drive train requires a large amount of installation space in the axial direction or a large amount of axial length.

Furthermore, it is known that, for example in the concept of WO 2019/101264 A1, in parallel mode the second electric machine often runs idle, whereby a corresponding electromagnetic resistance is generated due to induction. Because of this, it is even necessary for the second electric machine to be actively operated in order to reduce or even eliminate the mechanical resistance resulting from the electromagnetic resistance.

However, this procedure leads to a reduction in gearing efficiency, which leads to a less efficient gearing system at certain operating points (parallel mode).

SUMMARY

Against this background, it is an object of the present disclosure to provide a drive train for a hybrid motor vehicle which has a low requirement for axial installation space, for example in order to shorten the axial length of the electric machines, the transmission and the internal combustion engine, and which is, for example, able to prevent unnecessary running of an electric machine.

This object is achieved by the features of the independent claim. Further advantageous developments are the subject matter of the dependent claims.

In the present disclosure, a drive train for a hybrid motor vehicle comprises an input shaft which extends in the axial direction and which can be connected, for example directly, in a rotationally fixed or permanently rotationally fixed manner to a torsion damper device and/or to an internal combustion engine. "Permanent" is understood in the present description to mean inseparable, although disassembly or dismantling with tools is naturally possible.

Furthermore, the drive train has a first electric machine, which is connected directly to the input shaft and permanently to the input shaft in a rotationally fixed manner, the first electric machine comprising a rotor with a rotor support and a stator.

A rotor support can be understood as a component on which windings for coils and/or magnets can be arranged in order to be able to make the rotor of an electric machine rotate. The first and/or a second electric machine can be a so-called internal rotor.

The first electric machine has an installation space for installation which is formed by the outer dimensions, such as length, width and height, of the stator and within which the rotor support is arranged.

In addition, the drive train comprises a first transmission device for transmitting a torque and a rotation speed from the input shaft to an intermediate shaft. In this case, the first transmission device has an installation space for installation which is formed by the outer dimensions, such as length, width and height, of the first transmission device.

Furthermore, the first transmission device is arranged on the rotor support of the first electric machine in such a way that the installation space of the first transmission device and the installation space of the first electric machine overlap, whereby the installation space of the first transmission device is arranged at least partially or completely within the installation space of the first electric machine. In this way, the drive train requires less axial installation space compared to the prior art or the drive train has a smaller axial length.

Furthermore, the first transmission device is designed as a shiftable clutch apparatus and/or the first transmission device is designed as a transmission for converting a torque and a rotation speed of the input shaft. Owing to the fact that the installation spaces of the first transmission device and the first electric machine overlap, it is possible to combine the first electric machine with a shiftable clutch apparatus and/or with a transmission. As already mentioned above, the installation space of the first transmission device and the installation space of the first electric machine overlap or the first transmission device is arranged within the first electric machine. It is precisely by sharing a common installation space or a space in which the installation spaces of the first transmission device and the first electric machine overlap that precisely this space or its axial length can be saved over the entire drive train. The drive train can therefore be made shorter by the space or by the axial length which the first transmission device and the first electric machine share.

Furthermore, in the axial direction, the first transmission device or its installation space can be arranged at least partially or completely within the installation space of the first electric machine. The more the first transmission device or its installation space is arranged within the installation space of the first electric machine, the greater the saving in terms of installation space or in terms of axial length. Thus, in the case of the complete arrangement of the first transmission device within the installation space of the first electric machine, the greatest amount of axial length or the largest amount of installation space in the axial direction can be saved.

Alternatively or additionally, it is possible that in the axial direction the installation space of the first transmission device is at least 50% or at least 80% or completely arranged within the installation space of the first electric machine. In this case also, the more the first transmission device or its installation space is arranged within the installation space of the first electric machine, the greater the amount of axial length that can be saved compared to the prior art.

Even more precisely, the rotor support can have an installation space for installation which is formed by the outer dimensions of the rotor support, with the first transmission device or its installation space in the axial direction being arranged at least partially, at least 50% or at least 80% or completely within the installation space of the rotor support. In this way, if the first transmission device is arranged on the rotor support of the first electric machine, a maximum of axial length or installation space in the axial direction can be saved. In other words, the drive train can be made shorter in the maximum possible way.

Generally speaking, the higher the proportion of the installation space of the first transmission device within the installation space of the rotor support and/or within the installation space of the first electric machine, the greater the saving in axial installation space.

In addition, it is possible for the first transmission device or its installation space to be arranged completely within the installation space of the first electric machine in the radial direction. It can also be the case that the rotor support has an installation space for installation which is formed by the outer dimensions of the rotor support, with the first transmission device or its installation space being partially, at least 50% or completely arranged within the installation space of the rotor support in the radial direction. In this case also, the higher the degree of integration of the first transmission device within the installation space of the first electric machine, the more space-saving the drive train can be realized in the radial direction.

In the present description, "radial direction" can be understood to mean a direction that extends perpendicular to the axial direction.

Furthermore, in the present description, the term "installation space" or "installation space for installation" can be understood to mean the space that is available for the installation of a transmission device and/or a rotor support and/or an electric machine. In addition, the term "installation space" can be understood as the space that results from the outer measurements or outer dimensions or outer sizes or outer measures, such as length, width and height. With regard to the entire description, the outer measurements or outer dimensions or outer measures, such as length, width and height, can be the maximum, outer measurements or maximum, outer dimensions or maximum outer sizes or maximum, outer maximum measures, such as maximum length, maximum width and maximum height, of the corresponding component. The "installation space" can therefore deviate from the specific, complex shape of a component, such as a transmission device, for example a shiftable clutch apparatus, and simplify the specific shape to a cuboid or a so-called general cylinder, as is known from mathematics.

In other words, the term "installation space" in the present description can be understood to mean that a cuboid with a height, a length and a width is placed over a transmission device and/or over an electric machine and/or over a rotor support, whereby the transmission device or the electric machine or the rotor support rests in contact against the surfaces of the cuboid.

In other words, a transmission device and/or an electric machine and/or a rotor support of the electric machine fits exactly into the installation space of a cuboid or a general cylinder.

The term "installation space" in the present description can also be understood to mean that a general cylinder, with any course within a plane, is moved along a specific route, the route not being contained in the plane in which the general cylinder has any course. The route can be moved, for example, in the axial direction.

Furthermore, fastening means, such as screws or rivets, by which a transmission device and/or an electric machine and/or a rotor support is connected to another component, such as a shaft or a transmission or a clutch apparatus, cannot be counted as part of the installation space.

The installation space of the first transmission device or of a second transmission device or of the first electric machine or of a second electric machine or of a rotor support can be formed by the product of the maximum area, which can be oriented perpendicular to the axial direction, and the maximum width, which can be oriented in the axial direction. The maximum area, which can be oriented perpendicular to the axial direction, can be formed by a maximum length and a maximum height, both of which can be oriented perpendicular to the axial direction, similar to a radial direction.

Furthermore, the maximum width can be perpendicular to the maximum area, similar to a normal vector, as is known, for example, from mathematics. The maximum area can be formed by the maximum length and the maximum height, both of which are oriented perpendicular to the axial direction in which the maximum width is oriented.

Basically, for the present description it can be stated that a maximum area is oriented perpendicular to the axial direction and that a maximum width is oriented in the axial direction. The maximum area can be formed by a maximum length and a maximum height, both of which can be oriented perpendicular to the axial direction or to the maximum width.

The maximum area and the maximum width of the first electric machine and/or of a second electric machine can, as already indicated, be formed by the maximum outer measurements or maximum outer dimensions or maximum outer sizes or maximum outer measures, such as maximum length, maximum width and maximum height of the stator of the electric machine.

As also mentioned, the length and height can extend in directions that are oriented perpendicular to the axial direction, whereby the width can be oriented in the same direction as the course of the axial direction.

Furthermore, the maximum area and the maximum width of the first transmission device and/or of a second transmission device can be formed by their maximum outer measurements or maximum outer dimensions or maximum outer sizes or maximum outer measures, such as maximum length, maximum width and maximum height.

In addition, the maximum area of the rotor or of the rotor support, which can be oriented perpendicular to the axial direction, can be less than the maximum area of the stator, which can be oriented perpendicular to the axial direction, wherein the maximum width of the rotor, which can be oriented in the axial direction, is equal to or less than the maximum width of the stator, which can be oriented in the axial direction. In other words, the aforementioned features ensure that the rotor or the rotor support is not larger perpendicular to the axial direction and is not wider in the axial direction than the stator.

The maximum area of the first transmission device and/or of a second transmission device, which can each be oriented perpendicular to the axial direction, can also be smaller than the maximum area of the rotor support, which can be oriented perpendicular to the axial direction. The transmission direction can therefore be arranged within the rotor support.

The maximum width of the first and/or of a second transmission device can be equal to or less than the maximum width of the stator or of the rotor support or of the rotor in the axial direction, such that the first and/or a second transmission device has a similar or smaller width in the axial direction than the rotor or the stator. As a result, the transmission device can be arranged completely inside the rotor or stator in the axial direction.

The first transmission device can be arranged on the rotor support. The first transmission device can be formed at least partially integrally with the rotor support. An integral design of a plurality of components reduces the complexity of the drive train and thus reduces production costs.

Furthermore, the rotor and the rotor support of the first electric machine can have an input side and an output side. It is possible here for the input shaft to be arranged on the input side and/or the first transmission device to be arranged on the output side.

Furthermore, the drive train can comprise an intermediate shaft to which the first transmission device is connected and which extends in the axial direction. With the aid of an intermediate shaft, a torque and a rotation speed from the input shaft can be converted, for example, by a transmission, or can be disconnected from subsequent components by, for example, a shiftable clutch apparatus.

It is conceivable for the first transmission device to have toothed elements for realizing a transmission for converting a torque and a rotation speed of the input shaft, such that a permanent connection between the rotor support of the first electric machine and the intermediate shaft of the drive train can be realized. This allows a torque and a rotation speed to be transmitted from the input shaft to the intermediate shaft.

In this context, it is possible for the first transmission device to have a ring gear and a gearwheel, each as a toothed element.

The gearwheel can be engaged with the ring gear so that the gearwheel can roll in the ring gear.

Furthermore, the gearwheel can be arranged on the intermediate shaft, wherein the rotor support can have the ring gear, such that a torque and a rotation speed of the ring gear can be transmitted to the gearwheel and thus to the intermediate shaft.

The drive train can also comprise an intermediate shaft to which the first transmission device is connected and which extends in the axial direction.

In this case, the first transmission device can be designed as a shiftable clutch apparatus, for example as a multi-plate clutch, dog clutch or disk clutch, such that a releasable connection between the rotor support of the first electric machine and the intermediate shaft can be realized. This means that a torque and a rotation speed can be transmitted from the input shaft to the intermediate shaft or not.

Furthermore, the first transmission device can have a first and a second clutch partner as well as an apparatus for engaging and disengaging the clutch partners with one another.

The first transmission device can be configured and designed to bring the first clutch partner and the second clutch partner into a releasable engagement so that a torque and a rotation speed can be transmitted from the input shaft to the intermediate shaft, or not.

Furthermore, the first clutch partner can be arranged on the rotor support of the first electric machine so that a torque and a rotation speed can be transmitted from the input shaft to the intermediate shaft by engaging the first transmission device designed as a shiftable clutch apparatus.

In addition, the second clutch partner can be arranged on the intermediate shaft so that a torque and a rotation speed can be transmitted to the intermediate shaft by engaging the first transmission device designed as a shiftable clutch apparatus.

In addition, it is possible for the first clutch partner of the first transmission device to be formed integrally with the rotor support of the first electric machine. In this way, assembly of the drive train can be simplified because it consists of fewer parts, and thus production or assembly can be accelerated. The axial length of the drive train can also be kept small.

Finally, it should be mentioned that the apparatus for engaging and disengaging can be arranged on the first electric machine or on the intermediate shaft. Depending on the drive train, the arrangement on one or the other component makes more sense, for example, with respect to the available installation space.

The drive train can comprise a second electric machine which is connectable or releasably connectable or releasably connected to the intermediate shaft in a torque-transmitting manner.

The first electric machine and the second electric machine cannot be arranged coaxially with one another. This can be advantageous, for example, if the first transmission device is used as a transmission, for example with a ring gear.

The second electric machine can comprise a rotor with a rotor support, a stator and an installation space for installation which is formed by the outer dimensions of the stator of the second electric machine and in which the rotor support of the second electric machine is arranged.

Furthermore, the drive train can comprise a second transmission device for transmitting a torque and a rotation speed from the intermediate shaft to an output shaft.

The second transmission device can have an installation space for installation, which is formed by the outer dimensions of the second transmission device.

Here, the second transmission device can be arranged on the rotor support of the second electric machine in such a way that the installation space of the second transmission device and the installation space of the second electric machine overlap, whereby the installation space of the second transmission device is arranged at least partially within or completely within the installation space of the second electric machine. In this way, the drive train requires less axial installation space compared to the prior art or the drive train has a smaller axial length. In other words, as already mentioned, the installation space of the second transmission device and the installation space of the second electric machine overlap or the second transmission device is arranged within the second electric machine. By sharing a common installation space or a space in which the installation spaces of the second transmission device and the second electric machine overlap, it is precisely this space or its axial length, by which both overlap, that can be saved over the entire drive train. The drive train can therefore be made shorter by the space or by the axial length which the second transmission device and the second electric machine share or overlap.

The second transmission device can be designed as a shiftable clutch apparatus. This makes it possible to specifically control the transmission of a torque and a rotation speed within the drive train. It is also possible to prevent unnecessary running of the electric machine when, for example, only the drive from an internal combustion engine and/or from an electric machine is desired.

In the axial direction, the second transmission device or its installation space can be arranged at least partially or completely within the installation space of the second electric machine. The more the second transmission device or its installation space is arranged within the installation space of the second electric machine, the greater the saving in terms of installation space or in terms of axial length. Thus, in the case of the complete arrangement of the second transmission device within the installation space of the second electric machine, the greatest amount of axial length or the largest amount of installation space can be saved.

Alternatively or additionally, it is possible that in the axial direction the installation space of the second transmission device is arranged at least 50% or at least 80% or completely within the installation space of the second electric machine. In this case also, the more the second transmission device is arranged within the installation space of the second electric machine, the greater the amount of axial length that can be saved compared to the prior art.

Furthermore, the rotor support can have an installation space for installation which is formed by the outer dimensions of the rotor support, with the second transmission device or its installation space being arranged in the axial direction at least partially, at least 50% or at least 80% or completely within the installation space of the rotor support. In this way, if the second transmission device is arranged on the rotor support of the second electric machine, a maximum of axial length or installation space in the axial direction can be saved. In other words, the drive train can be maximally shortened.

Generally speaking, the higher the proportion of the installation space of the second transmission device within the installation space of the rotor support or the second electric machine, the greater the saving in axial installation space.

In addition, it is possible for the second transmission device or its installation space to be arranged completely within the installation space of the second electric machine in the radial direction.

It can also be the case that the rotor support has an installation space for installation which is formed by the outer dimensions of the rotor support, with the second transmission device or its installation space being partially, at least 50% or completely arranged within the installation space of the rotor support in the radial direction. In this case also, the higher the degree of integration of the second transmission device within the installation space of the second electric machine, the more space-saving the drive train can be realized in the radial direction.

Furthermore, the second electric machine can have an input and an output, wherein the intermediate shaft can be arranged at the input.

In addition, the drive train can comprise an output shaft which is arranged at the output of the second electric machine. With the help of the output shaft, a torque and a rotation speed can be taken out of the drive train and transmitted, for example, to a gearing input shaft.

In this case, the output shaft can be permanently connected in a rotationally fixed manner to the rotor support of the second electric machine such that it is not possible to decouple the second electric machine from the output shaft The second transmission device can be configured and designed in such a way that a torque and a rotation speed of the intermediate shaft and/or of the second electric machine can be transmitted or shiftably transmitted to an output shaft of the drive train. In other words, the second transmission device can be configured and designed such that a torque and a rotation speed can be transmitted in three scenarios. In a first scenario, a torque and a rotation speed can be transmitted from the intermediate shaft to the output shaft without the second electric machine being involved. In a second scenario, a torque and a rotation speed can be transmitted from the intermediate shaft and from the second electric machine to the output shaft. In a third scenario, torque and rotation speed can only be transmitted from the second electric machine to the output shaft.

The second transmission device can be designed as a shiftable clutch apparatus, for example as a multi-plate clutch, dog clutch or disk clutch so that a releasable connection between the rotor support of the second electric machine, the intermediate shaft and/or the output shaft can be realized. As a result, a torque and a rotation speed can be transmitted or can be shiftably transmitted from the intermediate shaft and/or the second electric machine to an output shaft of the drive train.

Furthermore, it is possible for the second transmission device to have a first, second and/or a third clutch partner as well as an apparatus for engaging and disengaging the clutch partners with one another.

The second transmission device can be configured and designed to bring the first clutch partner and the second clutch partner into releasable engagement or to bring the second clutch partner and the third clutch partner into releasable engagement or to bring all three clutch partners into releasable engagement with one another. A torque and a rotation speed can thus be transmitted or shiftably transmitted from the intermediate shaft and/or from the second electric machine to the output shaft. In a first scenario, a torque and a rotation speed can be transmitted from the intermediate shaft to the output shaft when, for example, the first and second clutch partners are engaged. The second electric machine can be decoupled from the output shaft. In a second scenario, a torque and a rotation speed can be transmitted from the intermediate shaft and from the second electric machine to the output shaft when, for example, the first, the second and the third clutch partners are engaged. In a third scenario, torque and rotation speed can be transmitted from the second electric machine to the output shaft when, for example, the second and third clutch partners are engaged. The first electric machine can be decoupled from the output shaft.

More specifically, the first clutch partner can be arranged on the intermediate shaft such that a torque and a rotation speed can be transmitted from the intermediate shaft to the output shaft by engaging the second transmission device designed as a shiftable clutch apparatus.

Furthermore, the second clutch partner can be arranged on the output shaft such that a torque and a rotation speed can be transmitted to the output shaft by engaging the second transmission device designed as a shiftable clutch apparatus.

In addition, the third clutch partner can be arranged on the second electric machine, for example on its rotor support, such that a torque and a rotation speed can be transmitted or shiftably transmitted from the second electric machine to the output shaft by engaging the second transmission device designed as a shiftable clutch apparatus.

To reduce manufacturing costs, the second or third clutch partner of the second transmission device can be designed integrally with the rotor support of the second electric machine.

Furthermore, it is possible that the apparatus for engaging and disengaging is arranged on the second electric machine or on the intermediate shaft or on the output shaft. It is therefore possible to attach the apparatus for engaging and disengaging within the drive train at any location that is most suitable, e.g. in terms of space requirements.

Furthermore, it is conceivable for the output shaft to be designed as part of a transmission for converting a torque and a rotation speed in interaction with a gearing input shaft.

In this case, the output shaft can comprise a gearwheel for transmitting a torque and a rotation speed of the output shaft to a gearing input shaft.

In this context, it is possible for the gearwheel to be formed in one piece with the output shaft.

Furthermore, the output shaft and the gearwheel can be connected to one another via a shaft-hub connection.

In light of the above statements, the first electric machine can be designed as a drive of a vehicle and/or as a generator for generating energy and/or for charging a battery of a vehicle.

In addition or as an alternative to this, the second electric machine can be designed as a drive of a vehicle and/or as a generator for generating energy and/or as a generator for charging a battery of a vehicle.

In this context, it is possible for both electric machines to drive a vehicle and/or to generate energy for it or for its drive.

The drive train can also be designed to implement several operating modes.

In a first operating mode, only the first electric machine, drivable by an internal combustion engine, can be used as a generator for generating energy and/or as a generator for charging a battery of a vehicle. In the first operating mode, the second transmission device can be controlled in such a way that a torque and a rotation speed of the intermediate shaft and/or the second electric machine are not transmitted to the output shaft of the drive train. This first operating mode therefore serves to generate electrical energy for, for example, a battery when a vehicle is stationary. The second electric machine is deactivated in the first operating mode. More specifically, in the first operating mode the second transmission device can be controlled so that it is disengaged and the clutch partners are not engaged in order to transmit neither rotation speed nor torque to the output shaft.

In a second operating mode, the second electric machine can be used as a drive of a vehicle and the first electric machine can be used as a generator to generate energy. This second operating mode thus serves as a serial hybrid drive, in which the second electric machine acts as a drive machine and an internal combustion engine is used as a drive machine for the first electric machine to generate electrical energy. In the second operating mode, the second transmission device can be controlled in such a way that a torque and a rotation speed of the intermediate shaft are not transmitted to the output shaft of the drive train, but a torque and a rotation speed of the second electric machine are transmitted to the output shaft of the drive train. In other words, in the second operating mode, the second transmission device can be controlled in such a way that the first clutch partner on the intermediate shaft and the second clutch partner on the output shaft are not engaged, but the second and third clutch partners can already be engaged. In this way, the drive train can be used to drive the wheels of a vehicle purely electrically. More precisely, in the second operating mode the second transmission device can be controlled in such a way that the clutch partners on the intermediate shaft and on the output shaft are not engaged. In addition, the second transmission device can be controlled in such a way that the clutch partners on the second electric machine and on the output shaft are engaged.

In a third operating mode, the second electric machine can be used as a drive of a vehicle and the first electric machine, drivable by an internal combustion engine, can be used as a generator for generating energy and/or as a drive amplifier for the second electric machine. In the third operating mode, the second transmission device can be controlled in such a way that a torque and a rotation speed of the intermediate shaft are transmitted to the output shaft of the drive train and a torque and a rotation speed of the second electric machine are transmitted to the output shaft of the drive train. More precisely, in the third operating mode, the second transmission device can be controlled in such a way that a rotation speed and a torque can be transmitted both from the intermediate shaft and from the second electric machine to the output shaft. Thus, all clutch partners can be engaged with each other.

This third operating mode can realize a parallel hybrid drive in which an internal combustion engine and additionally the first electric machine and/or the second electric machine act as a drive machine on the output shaft.

Furthermore, in a fourth operating mode, the first electric machine, drivable by an internal combustion engine, can be used as a generator for generating energy and/or as a drive amplifier. In the fourth operating mode, the second transmission device can be controlled in such a way that a torque and a rotation speed of the intermediate shaft are transmitted to the output shaft of the drive train, but no torque and no rotation speed of the second electric machine are transmitted to the output shaft of the drive train. More precisely, in the fourth operating mode, the second transmission device can be controlled in such a way that the clutch partners on the intermediate shaft and on the output shaft are engaged, but are not engaged on the second electric machine and on the output shaft. More precisely, in the fourth operating mode, the second transmission device can be controlled in such a way that the first clutch partner on the intermediate shaft and the second clutch partner on the output shaft are engaged. However, the second and third clutch partners cannot be engaged.

It should be noted that the individual operating modes can be combined with one another. For example, the first, second and third operating modes can be combined with one another in one exemplary embodiment. However, the first, second, third and fourth operating mode can also be combined with one another in one exemplary embodiment.

Furthermore, it is possible for the drive train to comprise an internal combustion engine and/or a torsion damper device. The internal combustion engine can be connected to the torsion damper device, for example connected in a rotationally fixed manner. The connection can, for example, be such that the torsion damper device is attached to a crankshaft of the internal combustion engine. The torsional damper device in turn can be arranged on its input side on the internal combustion engine and on its output side on the input shaft.

BRIEF DESCRIPTION OF THE DRAWINGS

The disclosure is explained in more detail below with reference to exemplary embodiments in conjunction with associated drawings. In the schematic drawings.

DETAILED DESCRIPTION

In the description below, the same reference signs are used for the same components.

Figure 1:
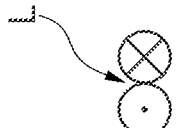
FIG. 1 shows a schematic view of a drive train according to a first exemplary embodiment.

FIG. 1 shows a schematic view of a drive train 1 according to a first exemplary embodiment.

More precisely, FIG. 1 shows a drive train 1 for a hybrid motor vehicle with an input shaft 2. The input shaft 2 extends in the axial direction A and is permanently connected in a rotationally fixed manner to a torsion damper device 3 and to an internal combustion engine 4.

The internal combustion engine 4 is connected to the torsion damper device 3 in such a way that the torsion damper device 3 is attached to a crankshaft of the internal combustion engine 3. Specifically, the torsion damper device 3 is arranged at its input side on the internal combustion engine 4 and at its output side on the input shaft 2.

In addition, the drive train 1 has a first electric machine 5, which is connected directly to the input shaft 2 and permanently to the input shaft 2 in a rotationally fixed manner. The first electric machine 5 has a rotor 6 with a rotor support 7 and a stator 8.

As shown in FIG. 1, the first electric machine 5 has an installation space B1 for installation which is formed by the outer dimensions 5L, 5B, 5H of the stator 8 and within which the rotor support 7 is arranged.

It should be noted that the mentioned lengths of all electric machines with their stators, rotors and rotor supports or the mentioned lengths of transmission devices are indicated by L in the two-dimensional representation of the drawings. In reality, each length would be oriented perpendicular to the plane of the sheet in the drawings. Owing to the fact that these are rotating components in the present context, the length can be the same magnitude as the height.

Furthermore, FIG. 1 shows that the drive train 1 has a first transmission device 9 for transmitting a torque and a rotation speed from the input shaft 2 to an intermediate shaft 12.

The first transmission device 9 has an installation space B2 for installation which is formed by the outer dimensions 9L, 9B, 9H of the first transmission device 9.

In this case, the first transmission device 9 is arranged on the rotor support 7 of the first electric machine 5 in such a way that the installation space B2 of the first transmission device 9 and the installation space B1 of the first electric machine 5 overlap. More precisely, the installation space B2 of the first transmission device 9 is arranged completely within the installation space B1 of the first electric machine 5.

By sharing a common installation space or a space in which the installation spaces B1, B2 of the first transmission device 9 and the first electric machine 5 overlap, it is precisely this space or its axial length over the entire drive train 1 that can be saved. The drive train 1 can therefore be made shorter by the space or by the axial length which the first transmission device 9 and the first electric machine 5 share.

As can be seen from FIG. 1, the first transmission device 9 is designed as a transmission for converting a torque and a rotation speed of the input shaft 2. For the sake of completeness, it should be noted that it is alternatively also possible for the first transmission device 9 to be designed as a shiftable clutch apparatus.

To be more specific, in the axial direction A, the first transmission device 9 is arranged completely within the installation space B1 of the first electric machine 5.

In other words, in the axial direction A, the installation space B2 of the first transmission device 9 is arranged completely within the installation space B1 of the first electric machine 5.

Furthermore, the rotor support 7 has an installation space B3 for installation which is formed by the outer dimensions 7L, 7B, 7H of the rotor support 7, with the first transmission device 9 or its installation space B2 in the axial direction A being arranged at least 80% within the installation space B3 of the rotor support 7.

In the radial direction R, the first transmission device 9 is arranged completely within the installation space B1 of the first electric machine 5 and also completely within the installation space B3 of the rotor support 7.

Furthermore, FIG. 1 shows that the first transmission device 9 is arranged on the rotor support 7, the first transmission device 9 being at least partially integrally formed with the rotor support 7.

The rotor 6 and the rotor support 7 of the first electric machine 5 have an input side 10 and an output side 11, the input shaft 2 being arranged on the input side 10 and the first transmission device 9 being arranged on the output side 11.

Furthermore, FIG. 1 shows that the drive train 1 has an intermediate shaft 12 to which the first transmission device 9 is connected and which extends in the axial direction A.

The first transmission device 9 has toothed elements 9A, 9C for realizing a transmission for converting a torque and a rotation speed of the input shaft 2, such that a permanent connection between the rotor support 7 of the first electric machine 5 and the intermediate shaft 12 of the drive train 1 is realized. As a result, a torque and a rotation speed can be transmitted from the input shaft 2 to the intermediate shaft 12.

According to FIG. 1, the first transmission device 9 has a ring gear 9A and a gearwheel 9C, each as a toothed element, the gearwheel 9C being in engagement with the ring gear 9A, such that the gearwheel 9C can roll in the ring gear 9A.

The gearwheel wheel 9C is arranged on the intermediate shaft 12, the rotor support 7 having the ring gear 9A, such that a torque and a rotation speed of the ring gear 9A can be transmitted to the gearwheel wheel 9C and thus to the intermediate shaft 12.

FIG. 1 also shows that the drive train 1 has a second electric machine 13, which can be releasably connected to the intermediate shaft 12 in a torque-transmitting manner.

The second electric machine 13 has a rotor 14 with a rotor support 15 and a stator 16 and an installation space B4 for installation which is formed by the outer dimensions 13L, 13B, 13H of the stator 16 of the second electric machine 13 and in which the rotor support 15 of the second electric machine 13 is arranged.

Furthermore, the drive train 1 has a second transmission device 17 for transmitting a torque and a rotation speed from the intermediate shaft 12 to an output shaft 20.

The second transmission device 17 has an installation space B5 for installation which is formed by the outer dimensions 17L, 17B, 17H of the second transmission device 17.

The second transmission device 17 is arranged on the rotor support 15 of the second electric machine 13 in such a way that the installation space B5 of the second transmission device 17 and the installation space B4 of the second electric machine 13 overlap. Specifically shown, the installation space B5 of the second transmission device 17 is arranged completely within the installation space B4 of the second electric machine 13.

Thus, in the axial direction A and in the radial direction R, the second transmission device 17 is arranged completely within the installation space B4 of the second electric machine 13. The more the second transmission device 17 is arranged within the installation space B4 of the second electric machine 13, the greater the saving in terms of the installation space or in terms of the axial length.

Even more precisely, the rotor support 15 of the second transmission device 17 has an installation space B6 for installation which is formed by the outer dimensions 15L, 15B, 15H of the rotor support 15, with the second transmission device 17 being arranged completely within the installation space B6 of the rotor support 15. In this way, a maximum of axial length or installation space is saved in the axial direction.

As shown in FIG. 1, the second transmission device 17 is designed as a shiftable clutch apparatus.

For the sake of completeness, it should be noted how the installation space of a transmission device and/or of an electric machine is determined.

The installation space of the first or second transmission device 9, 17 or of the first or second electric machine 5, 13 is formed by the product of the maximum area, which is oriented perpendicular to the axial direction A, and the maximum width B, which is oriented in the axial direction A.

Here, the maximum width B is similar to a normal vector perpendicular to the maximum area, which is formed by the length and the height, with the length being oriented perpendicular to the plane of the sheet with reference to FIG. 1.

The maximum area and the maximum width 5B, 13B of the first electric machine 5 and of the second electric machine 13 are formed by the outer measurements, such as maximum length, maximum width and maximum height, of the stator 8, 16 of the electric machine 5, 13. The same applies to the first and second transmission devices 9, 17.

The maximum area of the rotor 6, 14 or the rotor support 7, 15, which is oriented perpendicular to the axial direction A, is always smaller than the maximum area of the stator 8, 16, which is also oriented perpendicular to the axial direction A, with the maximum width B of the rotor 6, 14 being less than the maximum width B of the stator 8, 16. As already mentioned, both maximum widths are oriented in the axial direction A.

The maximum areas of the first and second transmission devices 9, 17, which are oriented perpendicular to the axial direction A, are also smaller than the maximum area of the rotor support 7, 15, which is also oriented perpendicular to the axial direction A.

The maximum width 9B, 17B of the first and second transmission devices 9, 17 is less than the maximum width 8B, 16B of the stator 8, 16 or of the rotor support 7, 15 or of the rotor 6, 14 in the axial direction A, so the first and second transmission device 5, 13 have a smaller width 5B, 13B in the axial direction A than the rotor 6, 14 or the rotor support 7, 15 or the stator 8, 16.

As a result, the transmission devices 9, 17 are arranged almost completely inside the rotors 6, 14 in the axial direction A.

Looking at FIG. 1, it can be seen that the second electric machine 13 has an input 18 and an output 19, with the intermediate shaft 12 being arranged at the input 18.

As already indicated, the drive train 1 has an output shaft 20, which is arranged at the output 19 of the second electric machine 13. More precisely, the output shaft 20 is permanently connected in a rotationally fixed manner to the rotor support 15 of the second electric machine 13, so decoupling the second electric machine 13 from the output shaft 20 is not possible.

The second transmission device 17 is configured and designed in such a way that a torque and a rotation speed of the intermediate shaft 12 or of the second electric machine 13 can be shiftably transmitted to the output shaft 20 of the drive train 1. However, it is also possible for a torque and a rotation speed of the intermediate shaft 12 and of the second electric machine 13 to be transmitted to the output shaft 20 using the second transmission device 17.

As indicated above, the second transmission device 17 is designed as a shiftable clutch apparatus, for example as a multi-plate clutch, dog clutch or disk clutch, such that a releasable connection between the rotor support 15 of the second electric machine 13 and the intermediate shaft 12 can be realized, whereby a torque and a rotation speed can be shiftably transmitted from the intermediate shaft 12 to the output shaft 20 of the drive train 1.

Furthermore, it can be seen in FIG. 1 that the second transmission device 17 has a first and a second clutch partner 17X, 17Y as well as an apparatus for engaging and disengaging (not shown) the clutch partners with one another.

The second transmission device 17 is configured and designed to bring the first clutch partner 17X and the second clutch partner 17Y into releasable engagement, such that a torque and a rotation speed from the intermediate shaft 12 and from the second electric machine 17 can be transmitted to the output shaft 20. However, if the first and second clutch partners 17X, 17Y are not engaged, only the second electric machine 17 can transmit a torque and a rotation speed to the output shaft 20.

As shown in FIG. 1, the first clutch partner 17X is arranged on the intermediate shaft 12, such that a torque and a rotation speed can be transmitted from the intermediate shaft 12 to the output shaft 20 by engaging the second transmission device 17, designed as a shiftable clutch apparatus.

The second clutch partner 17Y is arranged on the output shaft 20, such that a torque and a rotation speed can be transmitted to the output shaft 20 by engaging the second transmission device 17, designed as a shiftable clutch apparatus. As already mentioned, when the clutch apparatus is disengaged or the second transmission device 17 is disengaged, only one torque and one rotation speed can be transmitted from the second electric machine 17 to the output shaft 20. The second clutch partner 17Y of the second transmission device 17 is formed integrally with the rotor support 15 of the second electric machine 13. The apparatus for engaging and disengaging (not shown) can be arranged on the second electric machine 13.

Furthermore, FIG. 1 shows that the output shaft 20 is designed as part of a transmission for converting a torque and a rotation speed in interaction with a gearing input shaft 21.

The output shaft 20 has a gearwheel for transmitting a torque and a rotation speed of the output shaft 20 to the gearing input shaft 21, the gearwheel being formed in one piece with the output shaft 20. However, it is also possible for the output shaft 20 and the gearwheel to be connected to one another via a shaft-hub connection.

A gearing device 22 is connected to the gearing input shaft 21 and converts and distributes or only distributes the rotation speed and torque of the gearing input shaft 21.

In the present exemplary embodiment, the first electric machine 5 is designed as a drive of a vehicle and as a generator for generating energy, with the second electric machine 13 being designed only as a drive of a vehicle.

The drive train 1 is designed to realize a plurality of operating modes.

In a first operating mode, only the first electric machine 5, driven by the internal combustion engine 4, is used as a generator for generating energy or as a generator for charging a battery of a vehicle.

In the first operating mode, the second transmission device 17 is controlled in such a way that a torque and a rotation speed of the intermediate shaft 12 are not transmitted to the output shaft 20 of the drive train 1. As a result, the first operating mode is used to charge the battery of a vehicle using the first electric machine 5 when the vehicle is stationary. The second electric machine 13 is deactivated in the first operating mode.

In a second operating mode, the second electric machine 13 is used to drive a vehicle and the first electric machine 5 is used as a generator to generate energy.

In the second operating mode, the second transmission device 17 is controlled in such a way that a torque and a rotation speed of the intermediate shaft 12 are not transmitted to the output shaft 20 of the drive train 1, but a torque and a rotation speed of the second electric machine 13 are transmitted to the output shaft 20 of the drive train 1. More specifically, in the second operating mode, the second transmission device 17 is controlled in such a way that the clutch partners 17X, 17Y are not engaged, so as to transmit neither rotation speed nor torque to the output shaft 20. With the aid of this configuration, a so-called serial hybrid drive can be realized.

In a third operating mode, the second electric machine 13 is used as a drive of a vehicle and the first electric machine 5, driven by an internal combustion engine 4, is used as a generator for generating energy and/or as a drive amplifier for the second electric machine 13.

In the third operating mode, the second transmission device 17 is controlled in such a way that a torque and a rotation speed of the intermediate shaft 12 are transmitted to the output shaft 20 of the drive train 1 and a torque and a rotation speed of the second electric machine 13 are transmitted to the output shaft 20 of the drive train 1. More precisely, in the third operating mode, the second transmission device 17 is controlled such that the clutch partners 17X, 17Y are engaged in order to transmit rotation speed and torque. With the aid of this configuration, a so-called parallel hybrid drive can be realized.

Figure 2:
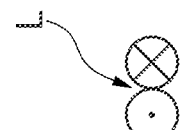
FIG. 2 shows a schematic view of a drive train according to a second exemplary embodiment.

FIG. 2 shows a schematic view of a drive train 1 according to a second exemplary embodiment.

In this exemplary embodiment also, the drive train 1 for a hybrid motor vehicle has an input shaft 2 which extends in the axial direction A and which is connected in a rotationally fixed manner to a torsion damper device 3 and to an internal combustion engine 4.

Furthermore, the drive train 1 has a first electric machine 5, which is connected to the input shaft 2 and permanently to the input shaft 2 in a rotationally fixed manner, the first electric machine 5 comprising a rotor 6 with a rotor support 7 and a stator 8.

The first electric machine 5 comprises an installation space B1 for installation which is formed by the outer dimensions 5L, 5B, 5H of the stator 8 and within which the rotor support 7 is arranged.

In addition, the drive train 1 has a first transmission device 9 for transmitting a torque and a rotation speed from the input shaft 2 to an intermediate shaft 12, the first transmission device 9 comprising an installation space B2 for installation, which is formed by the outer dimensions 9L, 9B, 9H of the first transmission device 9.

As can be seen in FIG. 2, the first transmission device 9 is arranged on the rotor support 7 of the first electric machine 5 in such a way that the installation space B2 of the first transmission device 9 and the installation space B1 of the first electric machine 5 overlap. More precisely, the installation space B2 of the first transmission device 9 is arranged completely within the installation space B1 of the first electric machine 5.

Identical to the first exemplary embodiment, the first transmission device 9 is designed as a transmission for converting a torque and a rotation speed of the input shaft 2. However, it is also possible here for the first transmission device 9 to be designed as a shiftable clutch apparatus.

Regarding further statements, in order to avoid unnecessary repetitions, reference is made to the first exemplary embodiment according to FIG. 1, which can be used analogously here.

Therefore, only the differences between the first and second exemplary embodiments are discussed below.

First of all, when comparing FIGS. 1 and 2, it should be noted that both figures only differ in terms of the structure of the second electric machine 13. It is precisely this difference or the precise structure in the drive train 1 after the first electric machine 5 that is explained in detail below.

As can be seen, in the second exemplary embodiment, the second transmission device 17 has an installation space B5 for installation which is formed by the outer dimensions 17L, 17B, 17H of the second transmission device 17.

The second transmission device 17 is arranged on the rotor support 15 of the second electric machine 13 in such a way that the installation space B5 of the second transmission device 17 and the installation space B4 of the second electric machine 13 overlap. Specifically shown, the installation space B5 of the second transmission device 17 is arranged completely within the installation space B4 of the second electric machine 13.

Thus, in the axial direction A and in the radial direction R, the second transmission device 17 is arranged completely within the installation space B4 of the second electric machine 13. The more the second transmission device 17 is arranged within the installation space B4 of the second electric machine 13, the greater the saving in terms of the installation space or in terms of the axial length.

Even more precisely, the rotor support 15 of the second transmission device 17 has an installation space B6 for installation which is formed by the outer dimensions of the rotor support 15, the second transmission device 17 being arranged completely within the installation space B6 of the rotor support 15. In this way, a maximum of axial length or installation space is saved in the axial direction.

Furthermore, the second electric machine 13 in the second exemplary embodiment also has an input 18 and an output 19, with the intermediate shaft 12 being arranged at the input 18.

In addition, the drive train 1 has an output shaft 20, which is arranged at the output 19 of the second electric machine 13.

The second transmission device 17 is configured and designed in such a way that a torque and a rotation speed of the intermediate shaft 12 and/or the second electric machine 13 can be shiftably transmitted to the output shaft 20 of the drive train 1. Therefore, several different modes are possible; more detail is provided below in this regard.

The second transmission device 17 is designed as a shiftable clutch apparatus, for example as a multi-plate clutch, dog clutch or disk clutch, such that a releasable connection between the rotor support 15 of the second electric machine 13, the intermediate shaft 12 and/or the output shaft 20 can be realized, whereby a torque and a rotation speed can be transmitted from the intermediate shaft 12 and/or the second electric machine 13 to the output shaft 20 of the drive train 1.

The second transmission device 17 has a first, second and a third clutch partner 17X, 17Y, 17Z as well as an apparatus for engaging and disengaging (not shown) the clutch partners with one another.

The second transmission device 17 is configured and designed to bring the first clutch partner 17X and the second clutch partner 17Y into a releasable engagement or to bring the second clutch partner 17Y and the third clutch partner 17Z into a releasable engagement or to bring all three clutch partners 17X, 17Y, 17Z into a releasable engagement with one another. A torque and a rotation speed can thus be shiftably transmitted from the intermediate shaft 12 and from the second electric machine 17 to the output shaft 20.

However, it is also possible for a torque and a rotation speed to be transmitted only from the intermediate shaft 12 to the output shaft 20 or only from the second electric machine 17 to the output shaft 20.

In all of the above options, the decisive factor is which clutch partner is engaged with which or not.

According to FIG. 2, the first clutch partner 17X is arranged on the intermediate shaft 12, such that a torque and a rotation speed can be transmitted from the intermediate shaft 12 to the output shaft 20 by engaging the second transmission apparatus 17, designed as a shiftable clutch apparatus.

The second clutch partner 17Y is arranged on the output shaft 20, such that a torque and a rotation speed can be transmitted to the output shaft 20 by engaging the second transmission device 17, designed as a shiftable clutch apparatus.

Furthermore, the third clutch partner 17Z is arranged on the second electric machine 13, for example on its rotor support 15, such that a torque and a rotation speed can be transmitted from the second electric machine 13 to the output shaft 20 by engaging the second transmission apparatus 17, designed as a shiftable clutch apparatus. The third clutch partner 17Z of the second transmission device 17 is formed integrally with the rotor support 15 of the second electric machine 13.

The apparatus for engaging and disengaging (not shown) can be arranged on the second electric machine 13 or on the intermediate shaft 12 or on the output shaft 20.

As already mentioned, the drive train 1 has an output shaft 20. This is designed as part of a transmission for converting a torque and a rotation speed in interaction with a gearing input shaft 21. Furthermore, the output shaft 20, the gearing input shaft 21 and the gearing device 22 are designed identically to the first exemplary embodiment, so further statements are omitted at this point and reference is made to the above.

In the present second exemplary embodiment, the first electric machine 5 is designed as a drive of a vehicle and as a generator for generating energy, with the second electric machine 13 being designed only as a drive of a vehicle.

In light of the aforementioned structural designs, the drive train 1 is designed to realize several operating modes.

In a first operating mode, only the first electric machine 5, driven by the internal combustion engine 4, is used as a generator for generating energy or as a generator for charging a battery of a vehicle. This means, for example, that a battery can be charged while the vehicle is stationary.

In this first operating mode, the second transmission device 17 is controlled in such a way that a torque and a rotation speed of the intermediate shaft 12 and of the second electric machine 17 cannot be transmitted to the output shaft 20 of the drive train 1. Rather, the second electric machine 13 is deactivated in the first operating mode. More specifically, in the first operating mode the second transmission device 17 is controlled in such a way that it is disengaged and the clutch partners 17X, 17Y, 17Z are not engaged, so as to transmit neither rotation speed nor torque to the output shaft 20.

In a second operating mode, the second electric machine 13 is used to drive a vehicle and the first electric machine 5 is used as a generator to generate energy. With the aid of this configuration, a so-called serial hybrid drive can be realized.

In the second operating mode, the second transmission device 17 is controlled in such a way that a torque and a rotation speed of the intermediate shaft 12 are not transmitted to the output shaft 20 of the drive train 1, but a torque and a rotation speed of the second electric machine 13 are transmitted to the output shaft 20 of the drive train 1. Thus, only the second electric machine 13 drives a vehicle with the drive train 1, whereas the first electric machine 13 is used exclusively to generate energy using the internal combustion engine 4. More precisely, in the second operating mode, the second transmission device 17 is controlled in such a way that the first clutch partner 17X on the intermediate shaft 12 and the second clutch partner 17Y on the output shaft 20 are not engaged, but the second and third clutch partners 17Y, 17Z are.

In a third operating mode, the second electric machine 13 is used to as a drive of a vehicle and the first electric machine 5, driven by the internal combustion engine 4, is used as a generator for generating energy and also as a drive amplifier for the second electric machine 13. With the aid of this configuration, a so-called parallel hybrid drive can be realized.

In this case, in the third operating mode, the second transmission device 17 is controlled in such a way that a torque and a rotation speed of the intermediate shaft 12 are transmitted to the output shaft 20 of the drive train 1 and a torque and a rotation speed of the second electric machine 13 are transmitted to the output shaft 20 of the drive train 1. More precisely, in the third operating mode, the second transmission device 17 is controlled in such a way that a rotation speed and a torque can be transmitted both from the intermediate shaft 12 and from the second electric machine 13 to the output shaft 20. All clutch partners 17X, 17Y, 17Z are therefore in engagement with one another.

In a fourth operating mode, the first electric machine 5, driven by the internal combustion engine 4, is used as a generator for generating energy and also as a drive amplifier. In this operating mode, the internal combustion engine 4 can be used as a driving machine and the first electric machine 5 can be used as a generator for generating energy and as a drive amplifier.

In this fourth operating mode, the second transmission device 17 is controlled in such a way that a torque and a rotation speed of the intermediate shaft 12 are transmitted to the output shaft 20 of the drive train 1, but no torque and no rotation speed of the second electric machine 13 are transmitted to the output shaft 20 of the drive train 1. More precisely, in the fourth operating mode, the second transmission device 17 is controlled in such a way that the first clutch partner 17X on the intermediate shaft 12 and the second clutch partner 17Y on the output shaft 20 are engaged, but the second and third clutch partners 17Y, 17Z are not engaged. FIGS. 1 to 2 are described again below, but in other words.

Both figures show a direct drive of a first electric machine 5 without transmission. Furthermore, an integration of a transmission within the first electric machine 5 is shown in both figures.

In addition, a shiftable clutch apparatus or a second transmission device 17 is integrated within the second electric machine 13.

In comparison with the prior art (FIG. 2 of WO 2019/101264 A1), which was discussed at the outset of the description, the clutch mentioned there was replaced by two clutches, which are positioned within the second electric machine 13 and enable the decoupling of the second electric machine 13, for example in parallel mode of the internal combustion engine 4 and the second electric machine 13 (see FIG. 2 of the present description). Furthermore, a transmission is also integrated within the first electric machine 5.

Furthermore, with a view to or comparison with the prior art, in particular with FIG. 2 of WO 2019/101264 A1, the gearing, transmission and bearing arrangement concept is largely retained.

Looking at FIG. 1, an exemplary embodiment without decoupling of the second electric machine 13 is shown.

For reasons of installation space, it may make sense for the first electric machine 5, designed as a generator, to be driven directly by the internal combustion engine 4 via the torsion damper device 3 without a transmission.

The first electric machine 5 encloses a first transmission device 9, designed as a transmission, both sharing the existing installation space.

The second transmission device 17, designed as a clutch apparatus, is placed within the rotor 14 of the second electric machine 13.

FIG. 2 shows a further exemplary embodiment, but with the possibility of decoupling the second electric machine 13.

In this case, the second transmission device 17, which is designed as a shiftable clutch apparatus, is arranged inside the second electric machine 13. The second transmission device 17 can be designed as a multi-plate clutch or dog clutch.

Furthermore, when comparing FIG. 2 with FIG. 1, it can be seen that the rotor 14 of the second electric machine 13 is mounted separately.

In light of the above statements, various driving states or operating modes can be implemented, which are already explained above.

LIST OF REFERENCE SIGNS

1 Drive train
2 Input shaft
3 Torsion damper device
4 Internal combustion engine
5 First electric machine
6 Rotor transmission device
7 Rotor support
8 Stator
9 First transmission device
9A Ring gear
9C Gearwheel
10 Input side
11 Output side
12 Intermediate shaft
13 Second electric machine
14 Rotor
15 Rotor support
16 Stator
17 Second transmission device
17X First clutch partner
17Y Second clutch partner
17Z Third clutch partner
18 Input
19 Output
20 Output shaft
21 Gearing input shaft
22 Gearing device
A Axial direction
B1 Installation space of the first electric machine
B2 Installation space of the first
B3 Installation space of the rotor support of the first electric machine
B4 Installation space of the second electric machine
B5 Installation space of the second transmission device
B6 Installation space of the rotor support of the second electric machine
5L, 6L, 7L, 8L, 9L, 13L, 14L, 15L, 16L, 17L Length of the part corresponding to the numbering
5B, 6B, 7B, 8B, 9B, 13B, 14B, 15B, 16B, 17B Width of the part corresponding to the numbering
5H, 6H, 7H, 8H, 9H, 13H, 14H, 15H, 16H, 17H Height of the part corresponding to the numbering
R Radial direction

The invention claimed is:

1. A drive train for a hybrid motor vehicle comprising:

an input shaft, extending in an axial direction and configured to be permanently connected in a rotationally fixed manner to at least one of a torsion damper device or to an internal combustion engine;

a first electric machine, which is connected directly on the input shaft and permanently to the input shaft in a rotationally fixed manner;

wherein the first electric machine comprises a rotor having a rotor support and a stator, wherein the first electric machine has an installation space for installation, which is formed by outer dimensions of the stator and within which the rotor support is arranged;

a first transmission device for transmitting a torque and a rotation speed from the input shaft to an intermediate shaft, wherein the first transmission device has an installation space for installation which is formed by the outer dimensions of the first transmission device, wherein the first transmission device is arranged on the rotor support of the first electric machine such that the installation space of the first transmission device and the installation space of the first electric machine overlap, whereby the installation space of the first transmission device is arranged at least partially within the installation space of the first electric machine, and wherein the first transmission device is configured as at least one of a shiftable clutch apparatus, or a transmission for converting a torque and a rotation speed of the input shaft;

a second electric machine, selectively connectable to the intermediate shaft in a torque-transmitting manner, wherein the second electric machine comprises a rotor having a rotor support and a stator as well as an installation space for installation, which is formed by outer dimensions of the stator of the second electric machine and in which the rotor support of the second electric machine is arranged;

a second transmission device for transmitting a torque and a rotation speed from the intermediate shaft to an output shaft;

wherein the second transmission device has an installation space for installation, which is formed by the outer dimensions of the second transmission device, wherein the second transmission device is arranged on the rotor support of the second electric machine such that the installation space of the second transmission device and the installation space of the second electric machine overlap, whereby the installation space of the second transmission device is arranged at least partially within the installation space of the second electric machine, wherein the second transmission device is configured as a shiftable clutch apparatus; and wherein the intermediate shaft and the output shaft are coaxial.

2. The drive train according to claim 1, wherein in the axial direction the installation space of the first transmission device is arranged at least partially or completely-within the installation space of the first electric machine.

3. The drive train according to claim 2, wherein the first transmission device is configured as a shiftable clutch apparatus comprising a releasable connection between the rotor support of the first electric machine and the intermediate shaft, whereby a torque and a rotation speed can be transmitted from the input shaft to the intermediate shaft.

4. The drive train according to claim 1, wherein the first transmission device has toothed elements for realizing a transmission for converting a torque and a rotation speed of the input shaft so that a permanent connection between the rotor support of the first electric machine and the intermediate shaft of the drive train can be realized, whereby a torque and a rotation speed can be transmitted from the input shaft to the intermediate shaft.

5. The drive train according to claim 1, wherein the second transmission device is configured to transmit a torque and a rotation speed of at least one of the intermediate shaft or of the second electric machine to the output shaft of the drive train, wherein the shiftable clutch apparatus comprises a releasable connection between the rotor support of the second electric machine, the intermediate shaft and the output shaft for transmitting a torque and a rotation speed from at least one of the intermediate shaft or the second electric machine to the output shaft of the drive train.

6. The drive train according to claim 5, wherein the second transmission device has a first, a second and a third clutch partner and an apparatus for engaging and disengaging clutch partners with one another, wherein the second transmission device is configured to bring a first clutch partner and a second clutch partner into a releasable engagement or the second clutch partner and the third clutch partner into a releasable engagement or to bring all three clutch partners into releasable engagement with one another for transmitting a torque and a rotation speed from at least one of the intermediate shaft or the second electric machine to the output shaft.

7. The drive train according to claim 6, wherein the first clutch partner is arranged on the intermediate shaft for transmitting a torque and a rotation speed from the intermediate shaft to the output shaft by engaging the second transmission apparatus configured as a shiftable clutch apparatus, wherein the second clutch partner is arranged on the output shaft for transmitting a torque and a rotation speed to the output shaft by engaging the second transmission device configured as a shiftable clutch apparatus, wherein the third clutch partner is arranged on the second electric machine for transmitting a torque and a rotation speed from the second electric machine to the output shaft by engaging the second transmission device configured as a shiftable clutch apparatus, wherein the apparatus for engaging and disengaging is arranged on the second electric machine or on the intermediate shaft or on the output shaft.

8. The drive train according to claim 1, wherein the first electric machine is configured as at least one of a drive of a vehicle or as a generator for generating energy, or wherein the second electric machine is configured as at least one of a drive of a vehicle or as a generator for generating energy.

9. The drive train according to claim 1, wherein the drive train is configured to realize a plurality of operating modes, wherein in a first operating mode only the first electric machine, drivable by an internal combustion engine, is used as a generator for generating energy, wherein in a second operating mode the second electric machine is used as a drive of a vehicle and the first electric machine is used as a generator for generating energy, wherein in a third operating mode the second electric machine is used as a drive of a vehicle and the first electric machine, drivable by an internal combustion engine, is used as at least one of a generator for generating energy or as a drive amplifier for the second electric machine, wherein in a fourth operating mode the first electric machine, drivable by an internal combustion engine, is used as at least one of a generator for generating energy or as a drive amplifier.

10. The drive train according to claim 1, wherein in the axial direction the installation space of the first transmission device is arranged at least 50% or at least 80% or completely within the installation space of the first electric machine.

11. A drive train for a hybrid motor vehicle comprising:

an input shaft, which extends in an axial direction and can be permanently connected in a rotationally fixed manner to at least one of a torsion damper device or to an internal combustion engine;

a first electric machine, which is connected directly on the input shaft and permanently to the input shaft in a rotationally fixed manner;

wherein the first electric machine comprises a rotor having a rotor support and a stator, wherein the first electric machine has an installation space for installation, which is formed by outer dimensions of the stator and within which the rotor support is arranged;

a first transmission device for transmitting a torque and a rotation speed from the input shaft to an intermediate shaft, wherein the first transmission device has an installation space for installation which is formed by outer dimensions of the first transmission device, wherein the first transmission device is arranged on the rotor support of the first electric machine such that the installation space of the first transmission device and the installation space of the first electric machine overlap, whereby the installation space of the first transmission device is arranged at least partially within the installation space of the first electric machine, and wherein the first transmission device is configured as at least one of a shiftable clutch apparatus or a transmission for converting a torque and a rotation speed of the input shaft;

wherein the drive train comprises an intermediate shaft, to which the first transmission device is connected and which extends in the axial direction, wherein the first transmission device has toothed elements for realizing a transmission for converting a torque and a rotation speed of the input shaft so that a permanent connection between the rotor support of the first electric machine and the intermediate shaft of the drive train can be realized, whereby a torque and a rotation speed can be transmitted from the input shaft to the intermediate shaft; wherein the drive train comprises a second electric machine, which can be connected to the intermediate shaft in a torque-transmitting manner, wherein the second electric machine comprises a rotor having a rotor support and a stator as well as an installation space for installation, which is formed by outer dimensions of the stator of the second electric machine and in which the rotor support of the second electric machine is arranged, wherein the drive train comprises a second transmission device for transmitting a torque and a rotation speed from the intermediate shaft to an output shaft, wherein the second transmission device has an installation space for installation, which is formed by outer dimensions of the second transmission device, wherein the second transmission device is arranged on the rotor support of the second electric machine such that the installation space of the second transmission device and the installation space of the second electric machine overlap, whereby the installation space of the second transmission device is arranged at least partially within the installation space of the second electric machine, and wherein the second transmission device is configured as a shiftable clutch apparatus; wherein the first electric machine is configured as at least one of a drive of a vehicle or as a generator for generating energy, or wherein the second electric machine is configured as at least one of a drive of a vehicle or as a generator for generating energy; and wherein the intermediate shaft and the output shaft are coaxial.

* * * * *